US009769189B2

(12) United States Patent
Mohaisen et al.

(10) Patent No.: US 9,769,189 B2
(45) Date of Patent: Sep. 19, 2017

(54) SYSTEMS AND METHODS FOR BEHAVIOR-BASED AUTOMATED MALWARE ANALYSIS AND CLASSIFICATION

(71) Applicant: VERISIGN, INC., Reston, VA (US)

(72) Inventors: Aziz Mohaisen, Chantilly, VA (US); Omar Alrawi, Doha (QA); Matthew Larson, Bethesda, MD (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 14/186,644

(22) Filed: Feb. 21, 2014

(65) Prior Publication Data

US 2015/0244733 A1 Aug. 27, 2015

(51) Int. Cl.
*H04L 29/06* (2006.01)
*G06F 21/56* (2013.01)

(52) U.S. Cl.
CPC ........ *H04L 63/1425* (2013.01); *G06F 21/561* (2013.01); *G06F 21/566* (2013.01)

(58) Field of Classification Search
CPC ... H04L 63/1425; G06F 21/561; G06F 21/566
See application file for complete search history.

(56) References Cited

U.S. PATENT DOCUMENTS

| | | | | |
|---|---|---|---|---|
| 5,263,120 | A * | 11/1993 | Bickel | 706/62 |
| 7,519,998 | B2 * | 4/2009 | Cai et al. | 726/24 |
| 7,523,016 | B1 * | 4/2009 | Surdulescu | G06F 21/316 |
| | | | | 702/185 |
| 7,779,472 | B1 | 8/2010 | Lou | |
| 7,809,670 | B2 | 10/2010 | Lee et al. | |
| 8,161,548 | B1 * | 4/2012 | Wan | G06F 21/566 |
| | | | | 713/188 |
| 8,245,295 | B2 | 8/2012 | Park et al. | |

(Continued)

FOREIGN PATENT DOCUMENTS

| | | |
|---|---|---|
| CN | 102930210 A | 2/2013 |
| WO | 2013113532 A1 | 8/2013 |

OTHER PUBLICATIONS

Williams et al., Evaluating Machine Learning Algorithms for Automated Network Application Identification, 2006, Swinburne Univ., Technical Report 060401B, p. 1-14.*

(Continued)

*Primary Examiner* — Joseph P Hirl
*Assistant Examiner* — Stephen Gundry
(74) *Attorney, Agent, or Firm* — Artegis Law Group, LLP

(57) ABSTRACT

Embodiments relate to systems and methods for behavior-based automated malware analysis and classification. Aspects relate to platforms and techniques which access a set of samples of malware, and extract or capture a set of low-level behavioral artifacts produced by those samples. The low-level artifacts can be used to organize or identify a set of features, based upon which the sample can be classified and/or clustered into different labels, groups, or categories. The artifacts and/or features can be analyzed by one or more selectable algorithms, whose accuracy, efficiency, and other characteristics can be compared to one another for purposes of performing a classification or clustering task. The algorithm(s) can be selected by a user to achieve desired run times, accuracy levels, and/or other effects.

23 Claims, 4 Drawing Sheets

(56) References Cited

U.S. PATENT DOCUMENTS

| | | | |
|---|---|---|---|
| 8,266,698 B1 | 9/2012 | Seshardi et al. | |
| 8,401,982 B1* | 3/2013 | Satish | G06F 21/566 706/12 |
| 8,464,345 B2 | 6/2013 | Satish et al. | |
| 8,490,194 B2* | 7/2013 | Moskovitch | G06F 21/566 726/24 |
| 8,516,584 B2* | 8/2013 | Moskovitch | G06F 21/566 726/23 |
| 8,635,694 B2* | 1/2014 | Malyshev | G06F 21/566 713/188 |
| 8,682,812 B1* | 3/2014 | Ranjan | H04L 63/1425 706/12 |
| 8,719,924 B1* | 5/2014 | Williamson | G06F 21/568 713/188 |
| 9,021,589 B2* | 4/2015 | Anderson et al. | 726/23 |
| 9,129,110 B1* | 9/2015 | Mason | G06F 21/564 |
| 9,171,160 B2* | 10/2015 | Vincent | G06F 21/566 |
| 9,177,146 B1* | 11/2015 | Lee | G06F 21/566 |
| 9,298,920 B1* | 3/2016 | Mason | G06F 21/564 |
| 2006/0026675 A1* | 2/2006 | Cai | G06F 21/562 726/22 |
| 2006/0037080 A1* | 2/2006 | Maloof | 726/24 |
| 2007/0240217 A1* | 10/2007 | Tuvell | G06F 21/56 726/24 |
| 2007/0289013 A1* | 12/2007 | Lim | 726/22 |
| 2007/0294768 A1* | 12/2007 | Moskovitch | G06N 3/0481 726/24 |
| 2008/0127336 A1* | 5/2008 | Sun | G06F 21/566 726/22 |
| 2008/0184371 A1* | 7/2008 | Moskovitch | G06F 21/566 726/24 |
| 2008/0313734 A1* | 12/2008 | Rozenberg | H04L 63/1425 726/22 |
| 2009/0013405 A1* | 1/2009 | Schipka | H04L 63/145 726/22 |
| 2009/0044272 A1* | 2/2009 | Jarrett | G06F 21/568 726/23 |
| 2009/0083855 A1* | 3/2009 | Apap | G06F 21/552 726/24 |
| 2009/0119242 A1* | 5/2009 | Vargas Martin | G06N 99/005 706/48 |
| 2009/0187992 A1* | 7/2009 | Poston | G06F 21/564 726/24 |
| 2009/0300765 A1* | 12/2009 | Moskovitch et al. | 726/24 |
| 2010/0011029 A1* | 1/2010 | Niemela | G06F 21/55 707/E17.044 |
| 2010/0180344 A1* | 7/2010 | Malyshev et al. | 726/23 |
| 2011/0041179 A1* | 2/2011 | St Hlberg | G06F 21/566 726/23 |
| 2011/0083187 A1* | 4/2011 | Malanov | G06F 21/562 726/24 |
| 2011/0154495 A1* | 6/2011 | Stranne | G06F 21/55 726/24 |
| 2011/0271341 A1* | 11/2011 | Satish | G06F 21/552 726/23 |
| 2011/0283361 A1* | 11/2011 | Perdisci | G06F 21/56 726/24 |
| 2011/0320816 A1* | 12/2011 | Yao | G06F 21/316 713/171 |
| 2011/0321040 A1* | 12/2011 | Sobel | G06F 21/53 718/1 |
| 2012/0084859 A1* | 4/2012 | Radinsky | G06F 21/56 726/23 |
| 2012/0151586 A1* | 6/2012 | Hentunen | G06F 21/563 726/24 |
| 2012/0158626 A1* | 6/2012 | Zhu et al. | 706/13 |
| 2012/0167218 A1 | 6/2012 | Poornachandran et al. | |
| 2012/0174227 A1* | 7/2012 | Mashevsky | G06F 21/562 726/24 |
| 2012/0260342 A1* | 10/2012 | Dube et al. | 726/24 |
| 2012/0260343 A1* | 10/2012 | Sun | G06F 21/566 726/24 |
| 2012/0266208 A1* | 10/2012 | Morris | G06F 21/56 726/1 |
| 2012/0284791 A1* | 11/2012 | Miller | G06F 21/554 726/22 |
| 2012/0311708 A1* | 12/2012 | Agarwal | G06F 21/55 726/24 |
| 2012/0317644 A1* | 12/2012 | Kumar | G06F 21/566 726/24 |
| 2013/0091571 A1* | 4/2013 | Lu | G06F 21/563 726/23 |
| 2013/0097704 A1* | 4/2013 | Gavrilut | G06N 3/02 726/23 |
| 2013/0097706 A1* | 4/2013 | Titonis | G06F 21/56 726/24 |
| 2013/0145471 A1 | 6/2013 | Richard et al. | |
| 2013/0167236 A1 | 6/2013 | Sick | |
| 2013/0247192 A1* | 9/2013 | Krasser | H04L 63/1425 726/23 |
| 2013/0269033 A1* | 10/2013 | Amaya Calvo | H04L 63/0227 726/23 |
| 2013/0326625 A1* | 12/2013 | Anderson | G06F 21/56 726/23 |
| 2014/0047544 A1* | 2/2014 | Jakobsson | G06F 21/55 726/23 |
| 2014/0068763 A1* | 3/2014 | Ward | H04L 63/1425 726/22 |
| 2014/0090061 A1* | 3/2014 | Avasarala et al. | 726/24 |
| 2014/0150105 A1* | 5/2014 | Yu | G06F 21/562 726/24 |
| 2014/0373148 A1* | 12/2014 | Nelms | H04L 63/1441 726/23 |
| 2015/0026808 A1* | 1/2015 | Perdisci | G06F 21/56 726/23 |
| 2015/0096022 A1* | 4/2015 | Vincent | G06F 21/566 726/23 |
| 2015/0096023 A1* | 4/2015 | Mesdaq | H04L 63/145 726/23 |
| 2015/0106927 A1* | 4/2015 | Ferragut | H04L 63/1416 726/23 |
| 2015/0128263 A1* | 5/2015 | Raugas | H04L 63/1408 726/23 |
| 2015/0200962 A1* | 7/2015 | Xu | G06F 21/562 726/23 |
| 2016/0203318 A1* | 7/2016 | Avasarala | G06F 21/56 726/23 |
| 2016/0261612 A1* | 9/2016 | Mesdaq | H04L 63/145 |

OTHER PUBLICATIONS

Lokuciejewski et al., Automatic Selection of Machine Learning Models for Compiler Heuristic Generation, Jan. 2010, HiPEAC, Statistical and Machine learning approaches to ARchitecture and compilaTion (SMART'10).*

Dahl et al., Large-scale malware classification using random projections and neural networks, May 2013, IEEE, Acoustics, Speech and Signal Processing (ICASSP), p. 3422-3426.*

Kotthoff et al., A preliminary Evaluation of Machine Learning in Algorithm Selection for Search Problems, 2011, Association for the Advancement of Artificial Intelligence, SoCS-2011, pp. 84-91.*

Zolkipli et al., "Malware Behavior Analysis: Learning and Understanding Current Malware Threats", 2010 Second International Conference on Network Applications Protocols and Services (NETAPPS), Sep. 2010, pp. 218, 221.

Gennari et al., "Defining Malware Families Based on Analyst Insights", 2011 IEEE International Conference on Technologies for Homeland Security (HST), Nov. 2011, pp. 396, 401.

* cited by examiner

SYSTEMS AND METHODS FOR BEHAVIOR-BASED AUTOMATED MALWARE ANALYSIS AND CLASSIFICATION

FIELD

The present teachings relate to systems and methods for behavior-based automated malware analysis and classification, and more particularly, to platforms and techniques for identifying malware family groups and generating clusters of similar malware samples based on low-level artifacts captured during execution of those malicious entities.

BACKGROUND

In the field of software security, platforms have been known which examine samples of viruses or other malware, and classify those samples into one of a predefined set of known malware families. In the most general terms, those classifiers can operate by examining the actual code of the malware to locate unique sequences or bytes, or they can instead examine the behavior of those entities while executing. In either of those respective signature-based and behavior-based classifiers, the logic assigns a generic malware family name or "label" to the best match from a library of known malware entities.

In addition, platforms are also known in the software security field in which samples of malware objects can be scanned for signature-based and behavior-based attributes, and assigned to malware groups having similar characteristics.

However, in known classification and/or clustering platforms, the system generally relies upon relatively high-level attributes or characteristics in narrowing down the potential classes or clusters into which a given malware sample will be placed. This limits the precision with which classes or groups can be assigned. Likewise, existing platforms, in particular for clustering purposes, rely upon a single chosen algorithm to identify similar malware groups, which can limit the effectiveness of the results. Further, existing platforms typically capture the (relatively high-level) attributes which they analyze from a fairly small sample set, which can also lead to inconsistencies or other shortcomings in the results.

It may be desirable to provide methods and systems for behavior-based automated malware analysis and classification, in which greater granularity in captured attributes, larger sample sets, and flexibility in applied algorithms can be leveraged to produce better malware identification results.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for behavior-based automated malware analysis and classification. More particularly, embodiments relate to platforms and techniques for automated malware analysis, classification, and characterization, wherein the sample set used to drive that analysis can comprise a comparatively large set of source attributes and other information, and that information can be extracted from relatively low-level operational artifacts of a computer or other device hosting the sample under analysis. In aspects, classification and/or clustering operations can be carried out on those artifacts using an extensible set of algorithms which can be tuned and/or selected based on accuracy and other parameters that are selectable or adjustable by the user. The ability to vary, examine, and change the operative algorithms can allow an analyst or other user to tune the performance or results achieved.

Reference will now be made in detail to exemplary embodiments of the present teachings, which are illustrated in the accompanying drawings. Where possible the same reference numbers will be used throughout the drawings to refer to the same or like parts.

Figure 1:
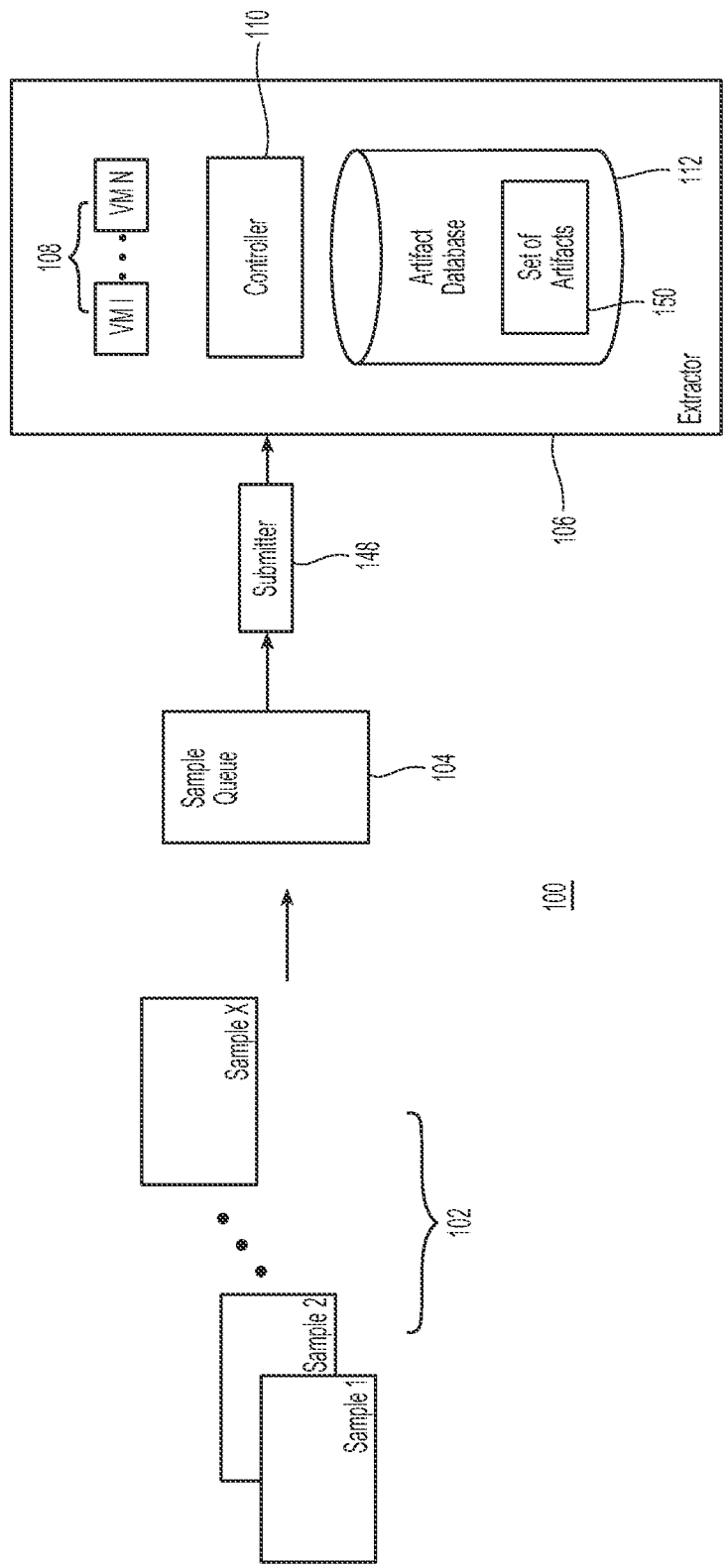
FIG. 1 illustrates an overall environment which can be used in systems and methods for behavior-based automated malware analysis and classification, according to various embodiments.

FIG. 1 illustrates an overall environment in which systems and methods for behavior-based automated malware analysis and classification can operate, according to aspects. In aspects as shown, a set of samples 102 can be assembled and placed into a sample queue 104, as part of the preparation for analysis and identification according to techniques described herein. The set of samples 102 can be or include program code, applications, routines, scripts, modules, data, files, text, media, and/or other information or content. In implementations, the set of samples 102 can be collected automatically from one or more source, such as, for instance, through anti-viral or other software of a Web site operator, network operator, service provider, Internet company including an infrastructure provider, and/or other entity or source.

In implementations, the set of samples 102 can in addition or instead be manually collected by a systems administrator for those or other entities, after reviewing traffic records, logs, and/or other files or data. In cases, the set of samples 102 can include samples which are known to contain viruses, Trojans, worms, and/or other malware or malicious code or content. In cases, the set of samples 102 can include samples whose content is not known or identified. The set of samples 102 can be provided to the sample queue 104 via the Internet or other network connection or channel. The samples contained in sample queue 104 can consist of binary files that are kept in static form and not executed. After being assembled in the sample queue 104, the set of samples 102 can be provided to a submitter 148 for transmission to an extractor 106. The submitter 148 is responsible for feeding samples from the set of samples 102 to the extractor 106. The samples can be selected by the submitter 148 based on their priority in the sample queue 104. Given that the set of samples 102 can be drawn from multiple sources including, once again for example, customer submissions, internal submissions, and software vendor samples, prioritization of the samples can be used.

Each of the samples in the set of samples 102 can be ranked by the submitter 148 with different priority. For instance, customer submissions can be assigned the highest priority followed by internal submissions from a network operator, and then software vendor feeds (such as from anti-virus providers). Other priorities, ranks, sources, and/or ways of ordering the set of samples 102 can be used.

Once passed to the extractor 106, the selected samples can be managed by a controller 110 for distribution to a set of virtual machines 108 and subsequent analysis. The set of virtual machines 108 are functionally independent of the controller 110, which allows the system to add and remove VMs without affecting the overall operation of the system. The set of virtual machines 108 can consist of images that have different versions of OSes or families of OSes, with different patch levels, such as the Windows™ family of operating systems, Linux distributions, and others.

In general, the extractor 106 can operate to examine the set of samples 102 and capture, extract, enumerate, and/or otherwise identify a set of artifacts 136 related to the subject samples.

The controller 110 can fetch highest priority samples from the sample queue 104 with the earliest smallest submission time, and begin to process them. The processing can begin by the sample being copied into an available virtual machine (VM) in the set of virtual machines 108, applying custom settings to the VM, if there are any, and running the sample. The configuration for each VM can be applied via a python agent installed on each VM, allowing the submitter 148 and/or other logic to modify the VM environment as necessary. For example, if an analyst identifies that a malware sample is not running because it checks a specific registry key for an environment artifact to detect the virtual environment, the analyst can submit a script with the sample that will adjust the registry key so the malware sample fails to detect the virtual environment and proceed to infect the system.

The controller 110 also detects the type of file being submitted and ensures it runs correctly. For example, if a dynamic link library (DLL) file is submitted, the controller 110 can install the DLL as a Windows™ Service and start the service to identify the behavior of the subject sample. If a universal resource locator (URL) is submitted, the controller 110 can launch a browser application, and visit the URL. After the sample is run for an allotted time, the controller 110 pauses the VM and begins artifact collection.

The controller 110 can run one or more tools, logic, and/or processes to capture any one or more of the following artifacts for inclusion in the set of artifacts 150:

1) File system information: attributes related to when files have been created, modified, and deleted; file content; and file meta data.
2) Registry information: attributes related to when a registry has been created, modified, and deleted; registry content; and registry meta data.
3) Network information: attributes related to domain name system (DNS) resolution; outgoing and incoming content; and meta data.
4) Volatile Memory information: This artifact can, in implementations, only be stored for relatively short intervals, such as one week or other period. The volatile memory information can be used to run malware detection framework tools, such as YARA signatures, on the memory to identify malware of interest.

The set of artifacts 150 including file system, registry, and network artifacts and their semantics can be extracted from source in the set of virtual machines 108 including any virtual disks and/or packet capture resources, such as a packet capture (PCAP) file. The artifacts and their semantics are then parsed by the controller 110 and stored in the artifact database 112, for instance, in corresponding tables for each artifact. The packet capture files can also stored in the artifact database 112 for record keeping. The virtual machines in the set of virtual machines 108 can also be configured to save a copy of the virtual memory to hard disk or other storage, when paused. All of the artifacts captured in the set of artifacts 150 can, once more, be stored to the artifact database 112, and/or other local or remote storage for further analysis and decomposition into classes and/or clusters.

Figure 2:
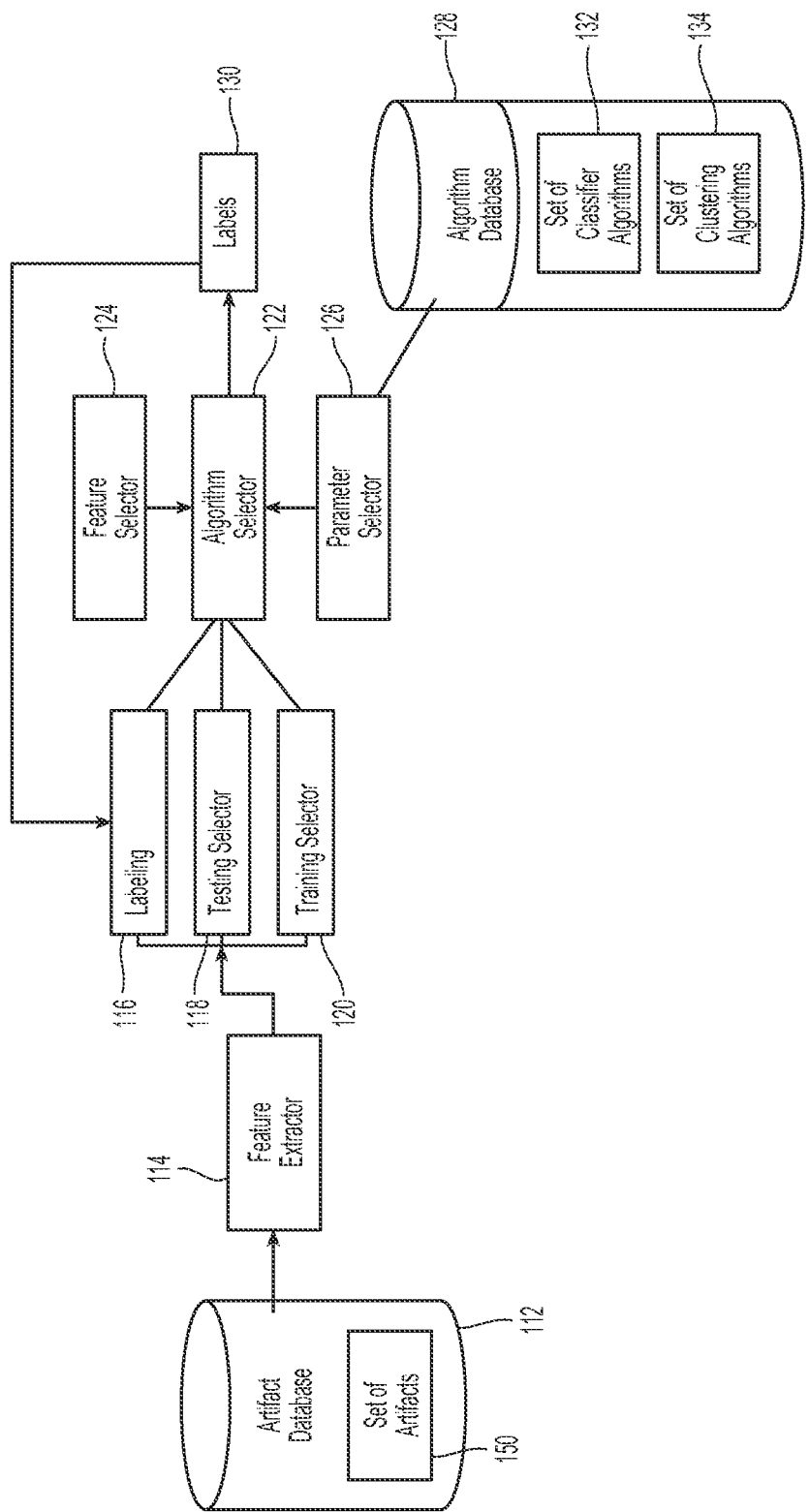
FIG. 2 illustrates components of the system used for algorithm selection and other actions, according to various embodiments.

More specifically and as for instance illustrated in FIG. 2, in implementations, in general, a feature extractor 114 can access the artifact database 112, and being the process of reading out desired artifacts for purposes of classification and/or clustering of the malware or other malicious content contained in the original set of samples 102. In implementations as shown, the feature extractor 114 can communicate with a set of software, logic, and/or processes including a labeling module 116, a testing selector module 118, and a training selector module 120 to conduct those operations. The feature extractor 114 can analyze the set of artifacts 150 stored in the artifact database 112 and extract representative features from them. In general, features can represent selected groupings of artifacts, which may relate to given performance or execution characteristics of the sample.

The features can be broken down based on the class of artifacts used for generating them, for instance, into several groups. A number are described, although it will be appreciated that other numbers or types of features or groups can be used. First, file system features can be used which are derived from file system artifacts created by the sample when run in the virtual environment of the set of virtual machines 108. Counts can be used both for files created, deleted, and modified, as well as counts for files created in predefined paths like % APPDATA %, % TEMP %, % PROGRAMFILES %, and other common locations. Counts can be kept for files created with unique extensions. for example if a malware sample creates four files on the system, a batch file (.BAT), two executable files (.EXE), and a configuration file can be tracked.

Second, class features can include registry-related information, such as registry created keys, modified keys, deleted keys, and/or a count of keys with certain type. Third, the feature classes can include network features, such as IP and port Unique destination IP, counts over certain ports, connections such as TCP, UDP, RAW.

Request type (e.g., POST, GET, HEAD) and response types or codes (200s through 500s) can also be tracked, as can size request and response distribution (e.g. DNS MX, NS, A records, PTR, SOA, CNAME). In terms of file size, the file size of created files can be used, including particularly the distribution of the files' size (rather than raw file size). The file size range can be partitioned, corresponding to the difference between the size of the largest and smallest files generated by a malware sample, into multiple ranges. Four ranges can be used, one for each quartile, and create counts for files with size falling into each range or quartile.

Registry features can also be tracked, and can be similar to the file features since counts can be tracked for registries created, modified, and deleted, registry type like REG_SZ, REG_BIN, and REG_DWORD.

Third, network features can be tracked, broken into groups. The first Network group is raw network features, which includes count of unique IP addresses, count of connections established for 18 different port numbers, quartile count of request size, and type of protocol (attention was limited to three popular protocols, namely the TCP, UDP, RAW). The second group is the HTTP features which include counts for POST, GET, and HEAD request; the distribution of the size of reply packets (using the quartile distribution format explained earlier), and counts for HTTP response codes, namely 200, 300, 400, and 500. The third category includes DNS (domain name system)-related features such as counts for A, PTR, CNAME, and MX record lookups.

For safety during working analysis, the controller 110 and/or other logic can block a list of wormable ports, including port 25, 587, 445, 139, and 137 at the router level when evaluating samples. The run time of samples can also be limited, and bandwidth can be limited.

In implementations, memory features may or may not be used in the evaluation of samples, but the system can be configured to collect and archive memory artifacts, as desired.

It may also be noted that in implementations, different features' values can be normalized or mapped into the range of 0 to 1 or other scales, thus not biasing the feature selection process towards any feature except of its true importance.

In terms of analyzing a sample based on its artifacts and/or features, an algorithm selector 122, communicating with the labeling modules, testing selector module 118, and/or training selector module 120 can build classifiers and/or clustering algorithms for behavior-based group and labeling of malware samples. Based on the class of algorithm to be used, whether it is binary classification or clustering, the training (if applicable) and testing data can be determined by the administrator or other user.

If the data is to be classified, the system can train a model using a verified and labeled data subset, and use unlabeled data for classification. The algorithm selector 122 can access an algorithm database 128 to access a set of classifier algorithms 132, which can contain or access multiple classification algorithms, including support vector machines (SVMs), decision trees, linear regression, and k-nearest-neighbor, among others. With any one or more choice of classification algorithm, the user can be presented with multiple settings and optimization options.

In terms of those classification algorithms and their selection, the system can implement several binary classification algorithms, and is not restricted to any one particular classifier. Examples of classification algorithms that can be employed include the support vector machine (SVM), linear regression (LR), classification trees, k-nearest-neighbor (KNN), and the perceptron method.

Although KNN is not strictly a binary classifier, according to implementations it can be modified by providing it with proper (odd) k, then voting is performed over which class a sample belongs to. To understand how different classification algorithms perform on the set of features and malware samples we had, testing of the classification of the malware samples across multiple algorithms has been performed, providing certain suggestions. For the SVM, and LR, several parameters for regularization, loss, and kernel functions have been tested. For this experiment, the same Zeus malware dataset was used as one class. A second class was generated using a dataset with the same size as Zeus from the total population that excludes ZBot in Table 3.

TABLE 3

Malware samples, and their corresponding labels, used in the classification training and testing.

| Size | % | Family | Description |
| --- | --- | --- | --- |
| 1,077 | 0.94 | Ramnit | File infector and a Trojan with pur-pose of stealing financial, personal, and system information |
| 1,090 | 1.0 | Bredolab | Spam and malware distribution bot |
| 1,091 | 1.0 | ZAccess | Rootkit Trojan for bitcoin mining, click fraud, and paid install. |
| 1,205 | 1.1 | Autorun | Generic detection of autorun fucntionality in malware. |
| 1,336 | 1.2 | Spyeye | Banking trojan for stealing personal and financial information. |
| 1,652 | 1.4 | SillyFDC | An autorun worm that spreads via portable devices and capable of downloading other malware. |
| 2,086 | 1.8 | Zbot | Banking trojan for stealing personal and financial information. |
| 2,422 | 2.1 | TDSS | Rootkit trojan for monetizing resources of infected machines. |
| 5,460 | 4.7 | Virut | Polymorphic file infector virus with trojan capability. |
| 7,691 | 6.7 | Sality | same as above, with rootkit, trojan, and worm capability. |
| 21,047 | 18.3 | Fakealert | Fake antivirus malware with purpose to scam victims. |
| 46,157 | 40.1 | Subtotal | |
| 69,000 | 59.9 | Others | Small mal, <1k samples each |
| 115,157 | 100 | Total | |

Using 10-fold cross validation, the classifier was trained on part of both datasets using a group of features, and combined the remaining of each set for testing. The algorithms shown in Table 4 were run to label the testing set. For the performance of the different algorithms, the accuracy, precision, recall, and F-score were used. The results are shown in Table 4. First of all, while all algorithms perform fairly well on all measures of performance by achieving a precision and recall above 85%, it may be noted that SVM (with polynomial kernel for a degree of 2) performs best, achieving more than 99% of precision and recall, followed by decision trees, which is slightly lagged by SVM (with linear kernel). Interestingly, and despite being simple and lightweight, the logistic regression model achieves close to 90% on all performance measures, also providing competitive results. While some provide less accuracy than the best performing algorithms, all of those algorithms can be used as a building block in platforms and techniques herein, which can ultimately make use of all classifiers to achieve better results.

TABLE 4

Results of binary classification using several algorithms in terms of their accuracy, precision, recall, and F-score.

| Algorithm | A | P | R | F |
| --- | --- | --- | --- | --- |
| SVM Polynomial Kernal | 99.22% | 98.92% | 99.53% | 99.22% |
| Classification Trees | 99.13% | 99.19% | 99.06% | 99.13% |
| SVM Linear Kernal | 97.93% | 98.53% | 97.30% | 97.92% |
| SVM Dual (L2R, L2L) | 95.64% | 96.35% | 94.86% | 95.60% |
| Log, Regression (L2R) | 89.11% | 92.71% | 94.90% | 88.63% |
| K-Nearest Neighbor | 88.56% | 93.29% | 83.11% | 87.90% |

TABLE 4-continued

Results of binary classification using several algorithms in terms of their accuracy, precision, recall, and F-score.

| Algorithm | A | P | R | F |
|---|---|---|---|---|
| Log, Regression (L1R) | 86.98% | 84.81% | 90.09% | 87.37% |
| Perceptron | 86.15% | 84.93% | 87.89% | 86.39% |

As for the cost of running the different algorithms, it may be noted that the SVM with polynomial kernel is relatively slow, while the decision trees require the most number of features to achieve high accuracy (details are omitted). On the other hand, while the dual SVM provides over 95% of performance on all measures, it runs relatively quickly. For that, and to demonstrate other aspects in our evaluation, attention may be restricted to the dual SVM, where possible. SVM is in aspects known for its generalization and resistance to noise.

To understand causes for the relatively high false alarms (causing part of the degradation in precision and recall) with some of the algorithms, mislabeled Zeus and non-Zeus malware samples were examined. It was noted that distance in the feature vector between misclassified samples is far from the majority of other samples within the class. This is however understandable, given that a single class of malware (Zeus and non-Zeus) includes within itself multiple sub-classes that the high-level label would sometimes miss. This observation is further highlighted in the clustering application (described below), where those mislabeled samples are grouped in the same group, representing their own sub-class of samples.

While, in implementations, the number of features used is relatively small when compared to known systems, not all features are equally important for distinguishing a certain malware family. Accordingly, this number can be perhaps be reduced while not affecting the accuracy of the classification algorithms. The reduction in the number of samples can be a crucial factor in reducing the cost of running the classification algorithm on large-scale datasets.

In order to understand the relative importance of each feature, with respect to the (linear) classification algorithms, the recursive feature elimination (RFE) algorithm was run, which ranks all features from the most important to the least important feature.

Given a set of weights of features, the RFE selects the set of features to prune recursively (from the least to the most important) until reaching the optimal number of features to achieve the best performance. In the linear classification algorithms, weights used for ranking features are the coefficients in the prediction model associated with each feature (variable).

Table 5 shows the performance measures for the SVM using different numbers of features. It may be noted that, while the best performance is achieved at the largest number of features, indicating the importance of all features together, the improvement in the performance is very small, particularly for the SVM. The lowest 50 features in rank improve the accuracy, precision, and recall by less than 2%. However, this improvement is as high as 20% with decision trees (results not shown). To this end, and for the algorithm of choice (SVM), it can be noted that a minimal set of features can be used to achieve a high accuracy while maintaining efficiency for the studied malware family, Zeus.

TABLE 5

The accuracy measures versus the number of features used for classification (SVM with L2R and L2L).

| Features | A | P | R | F |
|---|---|---|---|---|
| 3 | 65.3% | 66.9% | 60.5% | 63.6% |
| 6 | 73.2% | 76.1% | 67.6% | 71.6% |
| 9 | 89.6% | 87.6% | 92.3% | 89.9% |
| 15 | 94.1% | 94.0% | 94.1% | 94.1% |
| 25 | 94.4% | 94.9% | 93.9% | 94.4% |
| 35 | 94.6% | 95.3% | 93.8% | 94.6% |
| 45 | 94.9% | 95.6% | 94.0% | 94.8% |
| 65 | 95.6% | 95.8% | 95.3% | 95.5% |

In aspects, it is also possible to rank the different features by their high-level category. The classifier logic was run on the file system, memory (where available), registry, and network features independently. For the network features, the connection type, IP and port, request/response type and size, and DNS were further ranked as sub-classes of features. From this measurement, it was found that while the file system features are the most important for classification for the studied malware family, Zeus—they collectively achieve more than 90% of precision and recall for classification, while the port features are the least important. It was not clear how would the memory feature rank for the entire population of samples, but using them where available, they provide competitive and comparable results to the file system features. Finally, the rest of the features were ranked as network request/response and size, DNS features, then registry features.

It may be noted that the platforms and techniques herein do not only feature several algorithms, but also use several parameters for the same algorithm. For example, regularization and loss functions are widely used to improve estimating unknown variables in linear classification. For that, regularization imposes penalty for complexity and reduces over-fitting, while loss function penalizes incorrect classification. Widely used function types of parameters for linear classification are the L1 and L2 functions known in the art. In addition, since linear classification or programming problems can be stated as primal problems, they can also be converted to dual problems, which try to solve the primal problem by providing an upper bound on the optimal solution for the original (primal) problem. In the following the choice of the proper set of parameters—problem representation into primal or dual and the choice of regularization and loss functions—is examined as it affects classification by considering SVM and LR as two examples with a select set of parameters. The same dataset as above is used in this experiment as well. The results of this measurement are shown in Table 6.

TABLE 6

Selection of the support vector classifier with the best performing parameters. A, P, R, and F correspond to the accuracy, precision, recall, and F-score, respectively.

| Algorithm | A | P | R | F |
|---|---|---|---|---|
| L1-reg. log. regression (/) | 93.7% | 93.7% | 93.7% | 93.7% |
| L2-reg. log. regression (p) | 92.3% | 91.4% | 93.4% | 92.4% |
| L2-reg. L2-loss SVM (d) | 95.6% | 95.8% | 95.3% | 95.5% |
| L2-reg. L2-loss SVM (p) | 89.1% | 84.5% | 95.7% | 89.7% |
| L2-reg. L1-loss SVM (d) | 94.1% | 95.6% | 92.5% | 94.0% |
| L1-reg. L2-loss SVM (/) | 94.0% | 94.0% | 94.0% | 94.0% |
| L2-reg. log. regression (d) | 94.3% | 94.5% | 94.1% | 94.3% |

It may be observed that while all algorithm perform reasonably well on all measures of performance (namely, above 90% for all measures, for most of them), and can be used as a building block for the inventive system, the L2-regularization L2-loss functions, when combined with the dual optimization representation, provides the highest performance with all accuracy measures above 95%. All algorithms do not use kernel methods, and execute efficiently, even on large datasets.

In implementations, the system can leave the final decision of which algorithm to choose to the user, based on factors such as, for example, the classification accuracy and cost (both run-time and memory consumption). The system can also provide the ability to tune algorithms by using a feature selector module 124 and/or parameter selector module 126. Once the user selects a desired algorithm, the system can learn the best set of parameters for that algorithm based on the training set, and can use a trained model to output one or more labels 130 for the unlabeled data. The one or more labels 130 serve as the output or results of classification operations by the system, although they can also be used to re-train classification algorithms for future runs.

In terms of clustering rather than classification, using the same features extracted by the feature extractor 114 that are used for classification, the system can use unsupervised clustering algorithms to group malware samples into clusters. This can be accomplished by selecting one or more clustering algorithms from a set of clustering algorithms 134, which can be or include a set of hierarchal clustering algorithms, with variations and settings for clustering, cutting, and linkage, which settings can be by the user. Unlike classification operations, clustering operations can be unsupervised and do not require a training set to cluster the samples into appropriate clusters. The testing selector module 118 can run hierarchal clustering with several settings to present the user with preliminary cluster sizes, and number of clusters created using the different settings.

In terms of clustering operations, platforms and techniques herein can employ several distance metrics within a feature spaced or other abstract space with which to group samples, like the Jaccard index, cosine similarity, Hamming distance, Euclidean distance, and correlation. On the other hand, options for linkage include average, complete (maximum), median, single (minimum), ward, and centroid, among others.

Using various options noted above, the system gives the choice to the user to pick the best clustering size based on the user's data and, when available, the performance measures. Multiple cut thresholds are calculated for each distance and method to give an overview of how each clustering method performed. The user then makes a judgment to choose the most relevant results to fit the data to. To evaluate the performance of the clustering, a known set such as the manually labeled Zeus family can be used. In those regards, further tags can be used in the manual labeling that divide the Zeus family into multiple sub-families (also called Zeus variations), and consider that as a reference (or ground-truth) clustering. To add variety of families to the problem, and challenging the clustering algorithms, an equal number of samples can be picked, for instance from the families shown in Table 3. However, this time, selection can be limited to samples for which a correct label is known. Manually labeled malware data set was run against the clustering algorithms, evaluating the performance using the precision and recall defined herein. Table 8 shows the precision, recall, and cutting threshold for several distance metrics. First of all, it may be noticed that one can achieve high performance using easy-to-set parameters. While one can brute-force the cutting parameter range to achieve the highest possible accuracy, this option might not be always available with partially labeled data. Second, and more notably, it may be noticed that the achieved precision and recall outperform the classification algorithms noted above. This in part is attributed to the power of the clustering algorithm in distinguishing subclasses into distinct clusters, whereas subclasses in the binary classification that are close to each other in the feature vector space are grouped erroneously with each other. To this end, in implementations, one may use the results of the clustering to guide the binary classification, and to reduce its false alarms, thus improving its performance.

TABLE 8

Clustering Precision and recall for several linkage and cutting criteria and parameter valuses.

| | Linkage | Cutting | Precision | Recall |
|---|---|---|---|---|
| Correlation | Average | 0.40 | 93.4% | 100% |
| | Centroid | 0.25 | 96.2% | 100% |
| | Complete | 0.70 | 89.7% | 100% |
| | Median | 0.25 | 89.6% | 96.6% |
| | Single | 0.40 | 90.2% | 100% |
| | Ward | 0.25 | 93.5% | 98.2% |
| Cosine | Average | 0.25 | 84.1% | 100% |
| | Centroid | 0.25 | 84.6% | 100% |
| | Complete | 0.40 | 85.5% | 97.1% |
| | Median | 0.25 | 94.4% | 95.2% |
| | Single | 0.40 | 91.2% | 100% |
| | Ward | 0 25 | 94.2% | 96.9% |
| Hamming | Average | 0.25 | 98.9% | 97.6% |
| | Centroid | 0.25 | 98.5% | 100% |
| | Complete | 0.25 | 98.7% | 97.5% |
| | Median | 0 25 | 100% | 100% |
| | Single | 0.25 | 98.3% | 98.8% |
| | Ward | 0.25 | 99.3% | 97.6% |
| Jaccard | Average | 0.25 | 99.9% | 100% |
| | Centroid | 0.25 | 99.9% | 100% |
| | Complete | 0.25 | 99.9% | 100% |
| | Median | 0.40 | 99.9% | 99.8% |
| | Single | 0.25 | 99.9% | 100% |
| | Ward | 0.40 | 99.9% | 100% |

Based on the preliminary results of one or more clustering results, the user can pick which setting fits the data set provided, and can proceed to downstream labeling and verification processes. While the clustering capability of the system is not primarily intended for labeling malware samples, but rather for grouping different samples that are similar in their behavior, the system can be configured with logic required for malware labeling. In such implementations, after the clustering algorithm runs, one of the following options can be used to label the data.

Specifically, first, using analyst-vetted samples the resulting clusters can be augmented with labels, and the labels on unlabeled samples falling with the same clusters can be extrapolated to the same label. Second, for those clusters that do not have significant analyst-vetted data, other signatures or artifacts such memory signatures, where available, and further manual inspections can be used to generate candidate labels. Finally, in cases where none of the two preceding options above are available, a census of labels of antivirus scans for clusters' members can be used to identify appropriate label choices. Thus, the system including components shown in FIG. 2 can carry out classification operations, clustering operations, and/or both types of operations.

In both classification and clustering operations noted, various metrics can be used to determine a degree of accuracy or other performance. To evaluate the different algorithms in each application group, several accuracy measures can be used to highlight the performance of various algorithms. Considering a class of interest, S, the true positive ($t_p$) for classification is defined as all samples in S that are labeled correctly, while the true negative ($t_n$) is all samples that are correctly rejected. The false positive ($f_p$) is defined as all samples that are labeled in S while they are not, whereas the false negative ($f_n$) is all samples that are rejected while they belong to S. For validating the performance of the classifiers, precision can be defined as $P=t_p/(t_p+f_p)$, the recall as $R=t_p/(t_p+f_n)$, the accuracy as $A=(t_p+t_n)/(f_p+f_n+t_p+t_n)$, and the F-score defined as $F=2(p \times r)/(p+r)$.

For clustering, definitions of accuracy, precision, and recall can be used as known in the art. In short, the precision measures the ability of the clustering algorithm to distinguish between different samples and associate them to different clusters, whereas the recall measures how well the clustering algorithm assigns samples of the same type to the same cluster. To that end, given a reference (ground truth) clustering setting $T=\{T_i\}$ for $0<i \leq n_t$ and a set of learned clusters $L=\{L_i\}$ for $0<i \leq n_l$, the precision for the j-th learned cluster is computed as $P_j=\max\{|L_j \cap T_i|\}$ for $0<i \leq n_t$ while the recall for the j-th reference cluster is computed as $R_j=\max\{|L_i \cap T_j|\}$ for $0<i \leq n_l$. The total precision and recall of the algorithm are computed as $$\frac{1}{n_t}\sum_{i=1}^{n_t} P_i \text{ and } \frac{1}{n_t}\sum_{i=1}^{n_l} R_i,$$

respectively.

Figure 3:
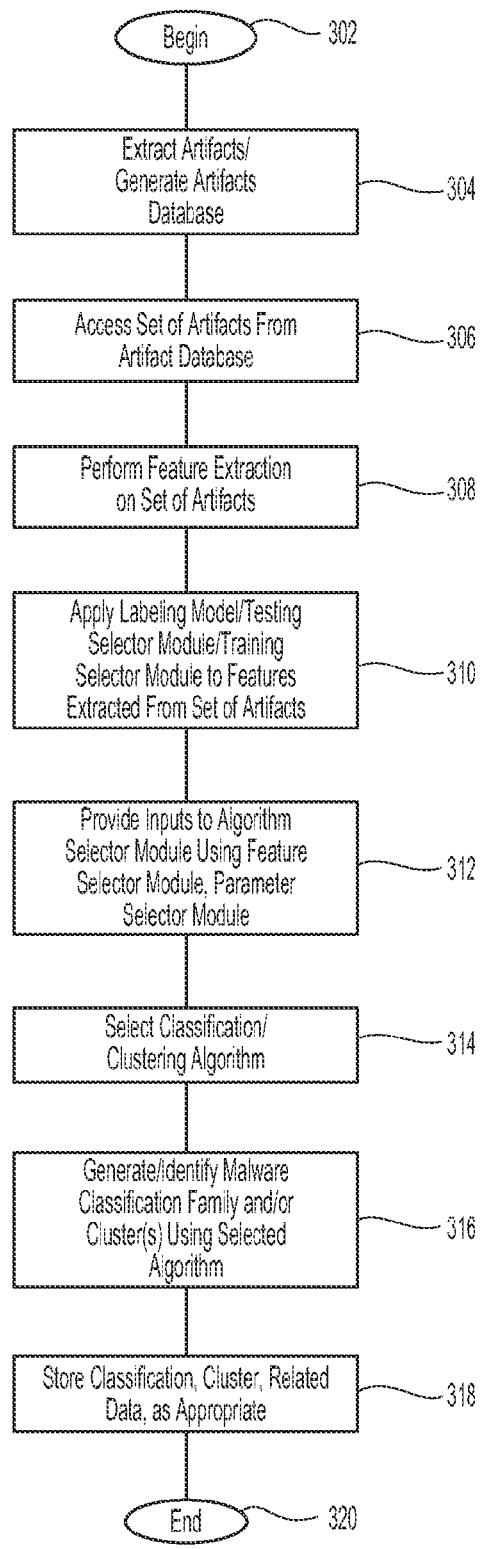
FIG. 3 illustrates a flowchart of processing that can be used in behavior-based automated malware analysis and classification, according to various embodiments.

FIG. 3 illustrates a flowchart of classification, clustering, and other processing that can be performed in systems and methods for behavior-based automated malware analysis and classification, according to aspects. In 302, processing can begin. In 304, the controller 110 can/or other logic can extract one or more artifacts form the set of samples 102, and generate or update the artifact database 112 with that data. In 306, the controller 110, feature extractor 114, and/or other logic can access the set of artifacts 150 in or from the artifact database 112. In 306, the feature extractor 114 and/or other logic can perform feature extraction on the set of artifacts 150, for instance, reading out artifacts to define various desired features of the samples. In 310, the labeling module, testing selector module 118, and/or training selector module 120 can be applied to the features extracted from the set of artifacts 150.

In 312, an administrator and/or other user can provide inputs to the algorithm selector module 122 using the feature selector module 124, the parameter selection module 126, and/or other input or interface. In 314, the administrator and/or other user can select a classification and/or clustering algorithm, for instance, an algorithm from the set of classifier algorithms 132 and/or set of clustering algorithms 134. In 316, the system can generate and/or identify a malware classification family and/or sample cluster(s), using the selected algorithm. In the case of a classification action, the system can output one or more labels 130 to associate with a given sample. In 318, the system can store classification, cluster, and/or related data, as appropriate. In 320, processing can repeat, return to a prior processing point, jump to a further processing point, or end.

Figure 4:
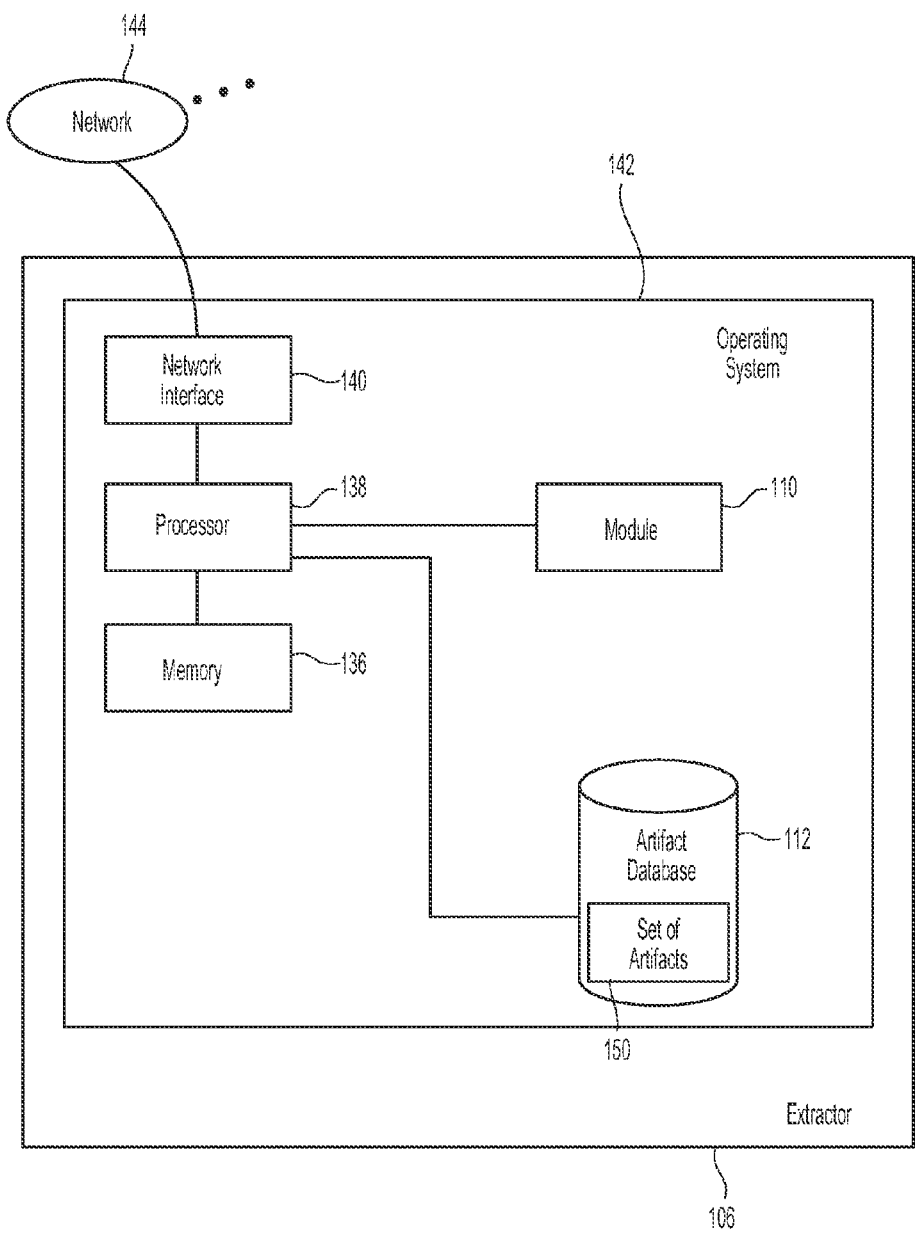
FIG. 4 illustrates exemplary hardware, software, and other resources that can be used in behavior-based automated malware analysis and classification, according to various embodiments.

FIG. 4 illustrates various hardware, software, and other resources that can be used in implementations of behavior-based automated malware analysis and classification, according to embodiments. In embodiments as shown, the extractor 106 can comprise a platform including processor 138 communicating with memory 136, such as electronic random access memory, operating under control of or in conjunction with an operating system 142. The processor 138 in embodiments can be incorporated in one or more servers, clusters, and/or other computers or hardware resources, and/or can be implemented using cloud-based resources. The operating system 142 can be, for example, a distribution of the Linux™ operating system, the Unix™ operating system, the Windows™ family of operating systems, or other open-source or proprietary operating system or platform. The processor 138 can communicate with the artifact database 112, such as a database stored on a local hard drive or drive array, to access or store the set of samples 102, the set of artifacts 150, and/or subsets of selections thereof, along with other content, media, or other data. The processor 138 can in addition further communicate with a network interface 140, such as an Ethernet or wireless data connection, which in turn communicates with the one or more networks 144, such as the Internet or other public or private networks. The processor 138 can, in general, be programmed or configured to execute control logic and to control various processing operations, including to generate artifacts, features, classifications, clusters, and/or other information. In aspects, the controller 110, algorithm selector 122, and/or other components or elements can be or include resources similar to those of the extractor 106, and/or can include additional or different hardware, software, and/or other resources. Other configurations of the extractor 106, controller 110, and algorithm selector 122, associated network connections, and other hardware, software, and service resources are possible.

The foregoing description is illustrative, and variations in configuration and implementation may occur to persons skilled in the art. For example, while embodiments have been described in which artifacts and other data are stored in a single artifact database 112, in implementations, that data or other data can be stored in multiple data stores, including cloud-based data stores. Similarly, while embodiments have been described in which the extractor 106 can comprise a single system or element which accesses the set of samples 102, in implementations, the extractor 106 can be or include multiple or distributed processors, servers, services, and/or other resources. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of identifying malware, comprising:
    accessing a set of samples, the set of samples comprising samples of different types of malware;
    running the set of samples on one or more computer systems;
    extracting, based on running the set of samples, a set of artifacts from the set of samples, wherein the set of artifacts includes information associated with a registry or a memory;
    determining a set of features from the set of artifacts for at least one sample in the set of samples;
    selecting one of a set of algorithms based on one or more selection features or parameters;

analyzing the set of features using the one of the set of algorithms; and identifying, based at least partially on analyzing the set of features, malware in the set of samples by at least one of classifying or clustering samples in the set of samples into the different types of malware.

2. The method of claim 1, wherein the set of artifacts comprises at least one of a set of file system artifacts, a set of registry artifacts, a set of network artifacts, or a set of memory artifacts.

3. The method of claim 1, wherein the set of algorithms comprises at least one of a state vector machine (SVM) algorithm, linear regression (LR) algorithm, a classification tree algorithm, a k-nearest-neighbor (KNN) algorithm, a perceptron algorithm, or a self-learning network algorithm.

4. The method of claim 1, wherein selecting one of a set of algorithms is further based on at least one of an accuracy rating, a runtime rating, a memory rating, or a storage rating.

5. The method of claim 1, wherein the analyzing comprises using the one of the set of algorithms to classify the samples in the set of samples, and the classification comprises performing a binary classification into one or more generic malware families.

6. The method of claim 5, further comprising assigning a label to the sample.

7. The method of claim 5, wherein performing the binary classification comprises performing a training operation on the one of the set of algorithms using a training set.

8. The method of claim 1, wherein the analyzing comprises using the one of the set of algorithms to cluster the samples in the set of samples, and the clustering comprises performing an unsupervised clustering algorithm.

9. The method of claim 8, wherein selecting one of a set of algorithms is further based on a cluster size.

10. The method of claim 8, wherein selecting one of a set of algorithms is further based on a cluster distance.

11. The method of claim 1, further comprising calculating a plurality of cutting parameters including the first parameter, wherein each cutting parameter included in the plurality of cutting parameters is associated with a different algorithm included in the set of algorithms.

12. The method of claim 1, wherein the information associated with the registry includes at least one of a registry created key, a modified key, a deleted key, and a count of keys of a specified type.

13. The method of claim 1, wherein the information associated with the memory includes volatile memory information stored for a short period.

14. A malware analysis system, comprising:

an interface to a data store storing a set of samples of malware, the set of samples comprising samples of different types of malware; and a processor, communicating with the data store via the interface, the processor being configured to:

access the set of samples, run the set of samples on one or more computer systems, extract, based on running the set of samples, a set of artifacts from the set of samples wherein the set of artifacts includes information associated with a registry or a memory, determine a set of features from the set of artifacts for at least one sample in the set of samples, select one of a set of algorithms based on one or more selection features or parameters, analyze the set of features using the one of the set of algorithms, and identify, based at least partially on analyzing the set of features, malware in the set of samples by at least one of classifying or clustering samples in the set of samples into the different types of malware.

15. The system of claim 14, wherein the set of artifacts comprises at least one of a set of file system artifacts, a set of registry artifacts, a set of network artifacts, or a set of memory artifacts.

16. The system of claim 14, wherein the set of algorithms comprises at least one of a state vector machine (SVM) algorithm, linear regression (LR) algorithm, a classification tree algorithm, a k-nearest-neighbor (KNN) algorithm, a perceptron algorithm, or a self-learning network algorithm.

17. The system of claim 14, wherein selecting one of a set of algorithms is further based on at least one of an accuracy rating, a runtime rating, a memory rating, or a storage rating.

18. The system of claim 14, wherein the analyzing comprises using the one of the set of algorithms to classify the samples in the set of samples, and the classification comprises performing a binary classification into one or more generic malware families.

19. The system of claim 18, wherein the process or further configured to assign a label to the sample.

20. The system of claim 18, wherein performing the binary classification comprises performing a training operation on the one of the set of algorithms using a training set.

21. The system of claim 14, wherein the analyzing comprises using the one of the set of algorithms to cluster the samples in the set of samples, and the clustering comprises performing an unsupervised clustering algorithm.

22. The system of claim 21, wherein selecting one of a set of algorithms is further based on a cluster size.

23. The system of claim 21, wherein selecting one of a set of algorithms is further based on a cluster distance.

* * * * *